United States Patent
Bak

(10) Patent No.: US 12,550,841 B2
(45) Date of Patent: Feb. 17, 2026

(54) ***DIONAEA* PLANT 'CROC'**

(71) Applicant: Corn Bak BV, Assendelft (NL)

(72) Inventor: Elly Bak, Aalsmeer (NL)

(73) Assignee: Corn Bak B.V. (NL)

(*) Notice: Subject to any disclaimer, the term of this patent is extended or adjusted under 35 U.S.C. 154(b) by 254 days.

(21) Appl. No.: 18/464,506

(22) Filed: Sep. 11, 2023

(65) Prior Publication Data
US 2025/0081911 A1    Mar. 13, 2025

(51) Int. Cl.
*A01H 6/30* (2018.01)
*A01H 5/12* (2018.01)
*A01H 6/00* (2018.01)

(52) U.S. Cl.
CPC .................. *A01H 6/00* (2018.05); *A01H 5/12* (2013.01)

(58) Field of Classification Search
CPC ........................................................ A01H 6/00
See application file for complete search history.

(56) References Cited

U.S. PATENT DOCUMENTS 10,813,322 B1 * 10/2020 Bak .......................... A01H 6/30

* cited by examiner

*Primary Examiner* — David H Kruse
(74) *Attorney, Agent, or Firm* — Cassandra Bright

(57) ABSTRACT

A new and distinct *Dionaea* hybrid named 'Croc' characterized by solid growth habit which is both dense and compact. Plants are composed of a single small rosette, measuring about 3 cm in height above the soil line at maturity. Mature traps are solid bright green. Plants of 'Croc' are well-suited for commercial production of small pot sizes and also have a long-lasting habit.

5 Claims, 1 Drawing Sheet
(1 of 1 Drawing Sheet(s) Filed in Color)

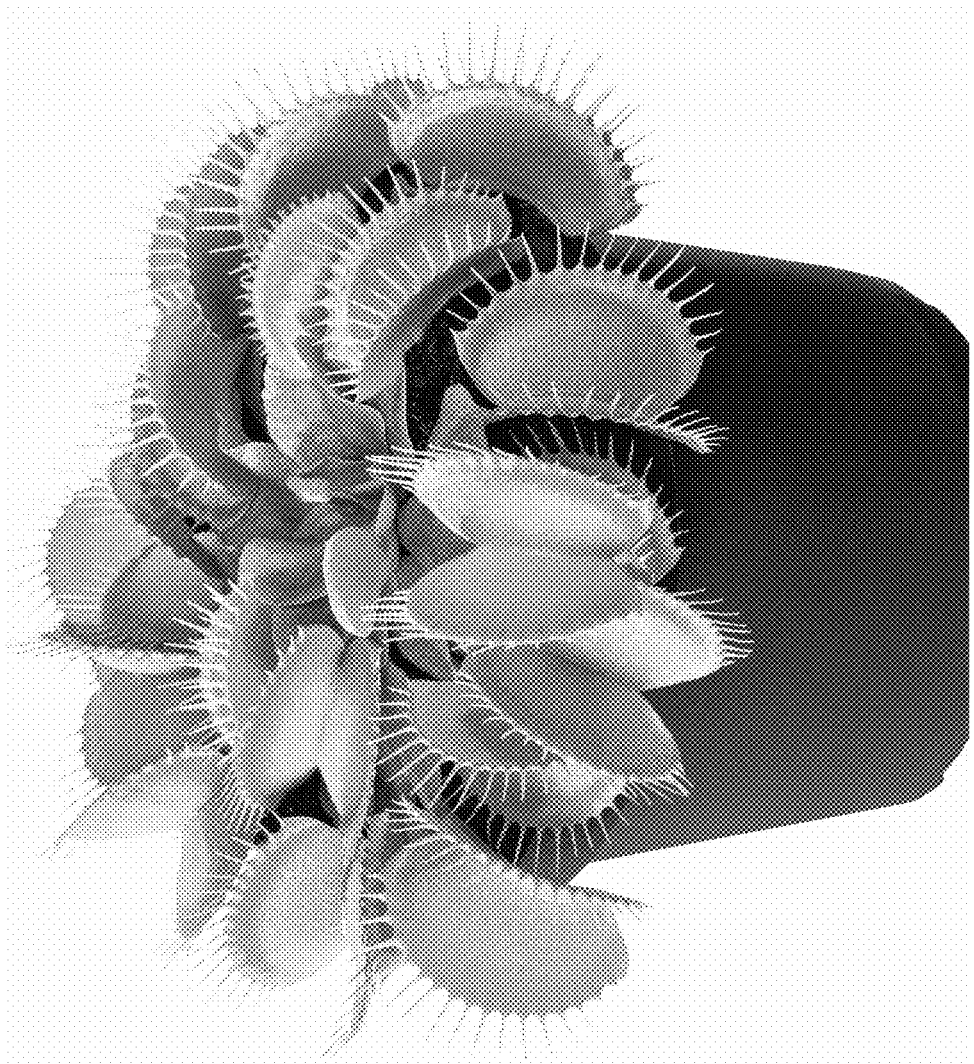

DIONAEA PLANT 'CROC'

FIELD OF THE INVENTION

The present invention relates to a new, distinct and stable cultivar of *Dionaea*, hereinafter referred to as 'CROC'. The present invention relates to seeds which are the *Dionaea* 'CROC', as well as, plants and plant parts produced by these seeds which have all of the morphological and physiological characteristics of the *Dionaea* cultivar 'CROC'. The present invention also relates to methods for producing these seeds and plants of the *Dionaea* cultivar 'CROC'. Furthermore, the present invention relates to a method of producing progeny *Dionaea* plants by crossing *Dionaea* 'CROC', as either the female or seed or male or pollen parent, with another *Dionaea* plant and selecting progeny.

BACKGROUND OF THE INVENTION

The present invention relates to a new, distinct and stable cultivar, botanically known as *Dionaea muscipula*, and hereinafter referred to by the variety denomination 'CROC'. The new *Dionaea* 'CROC' originated from a self-cross of an unnamed proprietary seedling. Development of the familial variety was conducted over several years, as part of a controlled breeding program by the inventor. The cross resulting in the new variety 'CROC' was made during 2014. 'CROC' was selected by the inventor in 2018, in Assendelft, The Netherlands. The objective of the breeding program is to create new *Dionaea* plants with interesting characteristics for the ornamental market. Characteristics sought included a high quantity of long-lasting traps on a small and compact plant.

*Dionaea* is a member of the Droseraceae family. *Dionaea muscipula* is the only species of the genus *Dionaea* and known under the common name Venus flytrap. It is native to the subtropical wetlands on the East Coast of the United States in North Carolina and South Carolina. The Venus flytrap is the most famous carnivorous plant and consists of a small rosette of leaves, each of which end in a trap edged with pointed teeth.

The Venus flytrap is a plant exhibiting visible movement, whose trap is triggered when one of the internal trigger hairs is touched twice or when two hairs of the same leaf are touched. There is considerable variation in the coloration of *Dionaea* traps. Most trap interiors are varying degrees of pink or red, with the pigment largely deposited in the glands. Newly emerged traps are usually lighter until exposed to light for a period. However, there are a few plants where red pigment is never present, with the trap interiors remaining yellowish green even in full light. There are also variations in petiole shape and width and whether the leaf lies flat on the ground or extends up at an angle of about 45-60°.

Most commonly the Venus flytrap develops flower stalks in May or June. As dormancy approaches at the end of the season, most leaves will turn black and dry. Normally growth ceases during the dormancy period. For detailed information regarding *Dionaea* morphology and cultivation, reference is made to the following publications, which are incorporated herein by reference: Reference: Schnell, Donald E., CARNIVOROUS PLANTS OF THE UNITED STATES AND CANADA, Timber Press, Inc., (2002); Lecoufle, Marcel., CARNIVOROUS PLANTS CARE AND CULTIVATION, Cassell Publishers Limited (1990).

*Dionaea* are popular commercial novelty ornamental plants. A need exists for a greater variety of *Dionaea* cultivars with consistent, attractive and unique ornamental features. Additionally, a need exists for additional *Dionaea* cultivars that can be easily propagated by seed, and reproduce the desired features consistently.

The new *Dionaea* 'CROC' was developed through a controlled breeding program and exhibits unique, desirable and stable characteristics.

SUMMARY OF THE INVENTION

The present invention provides a *Dionaea* plant selection including the following characteristics:
1. Solid growth habit; dense and compact.
2. A plant with a small rosette, measuring about 3 cm in height above the soil line at maturity.
3. Mature traps with bright green coloration.
4. Plants well-suited commercially for small pot sizes.
5. Long-lasting ornamental value.

These and other objectives have been achieved in accordance with the present invention which provides 'CROC' as a new *Dionaea* cultivar that is a product of a planned breeding program conducted by the inventor, Elly Bak in Assendelft, The Netherlands. The cross resulting in the new cultivar 'CROC' is a self-cross of an unnamed proprietary seedling producing progeny which are genotypically and phenotypically uniform. The new cultivar 'CROC' therefore can be produced by sexual reproduction by self-crossing the parent to produce a population of progeny plants, each of which has the combination of characteristics as herein disclosed for the new variety 'CROC'.

Seeds which are the cultivar 'CROC' are produced by crossing the parent selections and have been deposited with the NCIMB limited, Ferguson Building, Craibstone Estate, Bucksburn, Aberdeen, AB21 9YA, United Kingdom. The deposit was made Aug. 3, 2023. Accession No. NCIMB-44198 has been designated. Viability of the deposit has been confirmed by the depository.

OBJECTS OF THE INVENTION

The present invention relates to seeds which produce *Dionaea* 'CROC'. The present invention also relates to *Dionaea* plants, and parts thereof, having all the physiological and morphological characteristics of *Dionaea* 'CROC'. The present invention relates to a plant produced from seeds which are *Dionaea* 'CROC'. The present invention also relates to plant parts, such as pollen, seeds or inflorescence produced by *Dionaea* 'CROC'.

The present invention relates to a method of producing seed which are *Dionaea* 'CROC', by a self-crossing of the unpatented proprietary parent selection of *Dionaea muscipula* and harvesting seeds produced from said cross.

The present invention also relates to a method of producing plants having all the physiological and morphological characteristics of the *Dionaea* 'CROC' comprising the steps of (a) crossing the proprietary parent selections of *Dionaea muscipula* (unpatented). (b) harvesting seeds produced from said cross; and (c) producing plants from said harvested seeds.

BRIEF DESCRIPTION OF THE INVENTION

The following traits have been repeatedly observed and are determined to be unique characteristics of 'CROC' which in combination distinguish this *Dionaea* as a new and distinct cultivar:

1. Solid growth habit; dense and compact.
2. A plant with a small rosette, measuring about 3 cm in height above the soil line at maturity.
3. Mature traps with bright green coloration.
4. Plants well-suited commercially for small pot sizes.
5. Long-lasting ornamental value.

Parental Comparison

The new *Dionaea* 'CROC' can be compared to the proprietary parent variety *Dionaea*. Plants of the new cultivar 'CROC' are similar to plants of the parent variety in most horticultural characteristics, however the varieties differ in the following:
1. *Dionaea* 'Croc' has larger traps than the parent variety.
2. *Dionaea* 'Croc' produces more traps than the parent variety.
3. Plants of *Dionaea* 'Croc' are more compact and dense than plants of the parent variety.

Commercial Comparison

The new *Dionaea* 'CROC' can be compared to the commercial variety *Dionaea* 'Flexx' U.S. Pat. No. 10,813,322. Plants of the new cultivar 'CROC' differ from plants of *Dionaea* 'Flexx' in the following characteristics:
1. *Dionaea* 'Flexx' produces traps with a red-purple interior; trap interior of 'Croc' is bright green.
2. Mature leaf bases of *Dionaea* 'FLEXX' are not as wide as the leaf bases of *Dionaea* 'Croc'.

'CROC' has not been tested and observed under all possible environmental conditions. The phenotype of the new cultivar may vary with variations in environment such as temperature, light intensity, frequency of fertilization, composition of fertilizer, flowering treatment, day length and humidity, without any change in the genotype of the plant.

BRIEF DESCRIPTION OF THE PHOTOGRAPH

The patent or application file contains at least one drawing executed in color. Copies of this patent or patent application publication with color drawings will be provided by the Office upon request and payment of the necessary fees.

The accompanying photograph illustrates the overall appearance of the new *Dionaea* cultivar 'CROC' showing the colors as true as is reasonably possible with colored reproductions of this type. Colors in the photograph may differ slightly from the color values cited in the detailed botanical description which accurately describes the color of 'CROC'.

The accompanying drawing shows a typical mature potted plant of 'CROC', at approximately 9 months of age from potting size.

DETAILED BOTANICAL DESCRIPTION

The present invention was created by the inventor, Elly Bak in 2014 and selected in 2018 in Assendelft, The Netherlands.

This invention is directed to *Dionaea* plant having all the morphological and physiological characteristics of the cultivar 'CROC' produced from seeds which are the product of the self-crossing of the unnamed proprietary parental selection of *Dionaea muscipula*. This self-crossing produced progeny which were, and continue to be, phenotypically uniform. The new cultivar 'CROC' can therefore be produced by sexual reproduction by crossing of the parental *Dionaea muscipula* selection to produce a population of progeny plants, each of which has the combination of characteristics herein disclosed for the new cultivar 'CROC'.

The new cultivar 'CROC' can also be produced by asexually reproducing progeny from the self-cross of the parental selection. Asexual reproduction of the new cultivar by vegetative means by cuttings was first performed in 2019 in Assendelft, The Netherlands. The first 'CROC' plants propagated through the use of leaf cuttings flowered in 2019 in Assendelft, The Netherlands, and have demonstrated that the new cultivar reproduces true-to-type and that the combination of characteristics as herein disclosed for the new cultivar are firmly fixed and retained through successive generations of asexual reproduction.

The aforementioned photograph, together with the following observations, measurements and values describe the new *Dionaea muscipula* 'CROC' as grown in a greenhouse in Assendelft, The Netherlands, under conditions which closely approximate those generally used in commercial practice. Plants of 'CROC' were grown in a greenhouse with day temperatures ranging from 20° C. to 28° C. and night temperatures ranging from 18° C. to 23° C. No artificial lighting or photoperiodic treatments were conducted.

Color references are made to the Royal Horticultural Society Color Chart (RHS), 2001 edition, except where general colors of ordinary significance are used. Color values were taken under daylight conditions in a greenhouse in Assendelft, The Netherlands. The age of the plants of 'CROC' described is about 20 weeks of age.

Classification
  Botanical: *Dionaea muscipula*.
Plant
  General Appearance and Form: Tender herbaceous plant composed of ornamental traps.
  Height: Approx. 2.5 cm to 3 cm (above the soil line at maturity)
  Width: About 13 cm
  Shape: Rosette
  Plant Vigor: Good
  Cold Tolerance: Frost tender. Temperatures below 5° C. may damage plants.
  Fragrance: None observed.
Foliage
  Arrangement: Rosette
  Size of leaf:
    length: Average 4.5 cm (without trap)
    width: Average 1.2 cm (without trap)
  Shape of leaf: Spatulate
  Color:
    Upperside: Near RHS Yellow-Green 144A
    Underside: Near RHS Yellow-Green 144A
  Quantity: Average range 20 to 25
  Petiole:
    Length: Approx. 1 mm
    Diameter: Approx. 1 mm
    Color: Near RHS Yellow-Green 144A
    Texture: Smooth
Traps
  Size of trap: Length: About 3.5 cm from leaf attachment
    Width: About 1.5 cm closed.
  Shape of trap: Lobate
  Margin: Ciliate
  Color:
    Exterior: Near RHS Yellow-Green 144B
    Interior: Near RHS Yellow-Green 145A
    Exterior Veins: Near RHS Yellow-Green 144B
    Interior veins: Near RHS Yellow-Green 145A Quantity: Average 20 to 25
Trigger Hairs:
    Length: 2 mm
    Color: Near RHS Yellow-Green 144B, very small and hard to distinguish color
Guard Hairs:
    Length: Average 6 mm
    Color: Near RHS Yellow-Green 145C
Digestive gland: Not visible.
Nectar Gland: Not visible.
Flowers
    Quantity: 2 to 4 inflorescences. Each umbel has an average of 7 individual flowers.
    Length of flowering stem: approx. 16 cm
    Color: Near RHS Yellow-Green 144A
    Inflorescence type: Umbel composed of on average 8 flowers.
    Diameter of individual flower: Approx. 3 cm
        Petal length: about 1.5 cm
        Petal width: about 9 mm
    Color of flower: Near RHS White 155A
REPRODUCTIVE ORGANS: Minute, indistinguishable as individual parts.
SEEDS/FRUIT: Fruit and seed production have not been observed on plants of *Dionaea* 'CROC'.
DISEASE/PEST RESISTANCE: Not observed to date.
DISEASE/PEST SUSCEPTIBILITY: Not observed to date.

I claim:

1. A *Dionaea* plant named 'CROC', representative seed deposited at the NCIMB in Aberdeen, Scotland AB21 9YA NCIMB and having accession number 44198.

2. A *Dionaea* seed that produces the plant in claim 1.

3. A plant part obtained from the *Dionaea* plant of claim 1.

4. A method of producing *Dionaea* progeny plant comprising the steps of
    (a) crossing *Dionaea* 'CROC', representative seed of said plant having been deposited at the NCIMB, having accession number 44198, as a female or male parent with another *Dionaea* plant, and
    (b) selecting progeny.

5. The method according to claim 4, wherein the second *Dionaea* plant is 'CROC', representative seed of said plant having been deposited at the NCIMB, assigned accession number 44198.

* * * * *